United States Patent
Leite et al.

(10) Patent No.: US 8,495,113 B2
(45) Date of Patent: Jul. 23, 2013

(54) INCORPORATING BROWSER-BASED FIND FUNCTIONALITY INTO CUSTOMIZED WEBPAGE DISPLAYS

(75) Inventors: Lea T. Leite, Boynton Beach, FL (US); Jonathan Palgon, Boynton Beach, FL (US); Arun K. Ramamurthy, Delray Beach, FL (US); Roberto Vila, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 12/815,858

(22) Filed: Jun. 15, 2010

(65) Prior Publication Data

US 2011/0307481 A1    Dec. 15, 2011

(51) Int. Cl.
    *G06F 17/00*    (2006.01)
(52) U.S. Cl.
    USPC ........... 707/912; 707/609; 707/705; 707/790; 707/821; 707/607
(58) Field of Classification Search
    USPC .................. 707/607, 609, 705, 790, 821, 912
    See application file for complete search history.

(56) References Cited

U.S. PATENT DOCUMENTS

| | | | |
|---|---|---|---|
| 6,393,407 B1 | 5/2002 | Middleton, III et al. | |
| 7,516,154 B2 | 4/2009 | Chan | |
| 7,567,916 B1 | 7/2009 | Koeppel et al. | |
| 2004/0260767 A1 | 12/2004 | Kedem et al. | |
| 2008/0114639 A1 | 5/2008 | Meek et al. | |
| 2008/0214156 A1 | 9/2008 | Ramer et al. | |
| 2009/0024465 A1 | 1/2009 | Burckart et al. | |
| 2009/0144124 A1 | 6/2009 | Surendran et al. | |
| 2009/0186635 A1 | 7/2009 | Vieri | |
| 2011/0043652 A1* | 2/2011 | King et al. | 348/222.1 |

FOREIGN PATENT DOCUMENTS

WO    0237297 A1    5/2002

* cited by examiner

*Primary Examiner* — Sana Al Hashemi
(74) *Attorney, Agent, or Firm* — Law Office of Jim Boice

(57) ABSTRACT

A computer implemented method, system and/or computer program product dynamically display ancillary content on a webpage. A text entry is detected as an input to a find engine that locates and highlights the text entry within a main body of a webpage being displayed on a computer. A scope of the text entry is determined based on the textual context of the text entry and the type of webpage being displayed. An in-place adjustment is then utilized to automatically retrieve and display ancillary content on the webpage based on the textual context of the text entry and the type of webpage being displayed without refreshing the main body of the webpage.

11 Claims, 3 Drawing Sheets

INCORPORATING BROWSER-BASED FIND FUNCTIONALITY INTO CUSTOMIZED WEBPAGE DISPLAYS

BACKGROUND

The present disclosure relates to the field of computers, and specifically to information displayed on computers. Still more particularly, the present disclosure relates to webpages and customized content displayed on webpages.

BRIEF SUMMARY

A computer implemented method, system and/or computer program product dynamically displays ancillary content on a webpage. A text entry is detected as an input to a find engine that locates and highlights the text entry within a main body of a webpage being displayed on a computer. A scope of the text entry is determined based on the textual context of the text entry and the type of webpage being displayed. An in-place adjustment is then utilized to automatically retrieve and display ancillary content on the webpage based on the textual context of the text entry and the type of webpage being displayed without refreshing the main body of the webpage.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium (s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
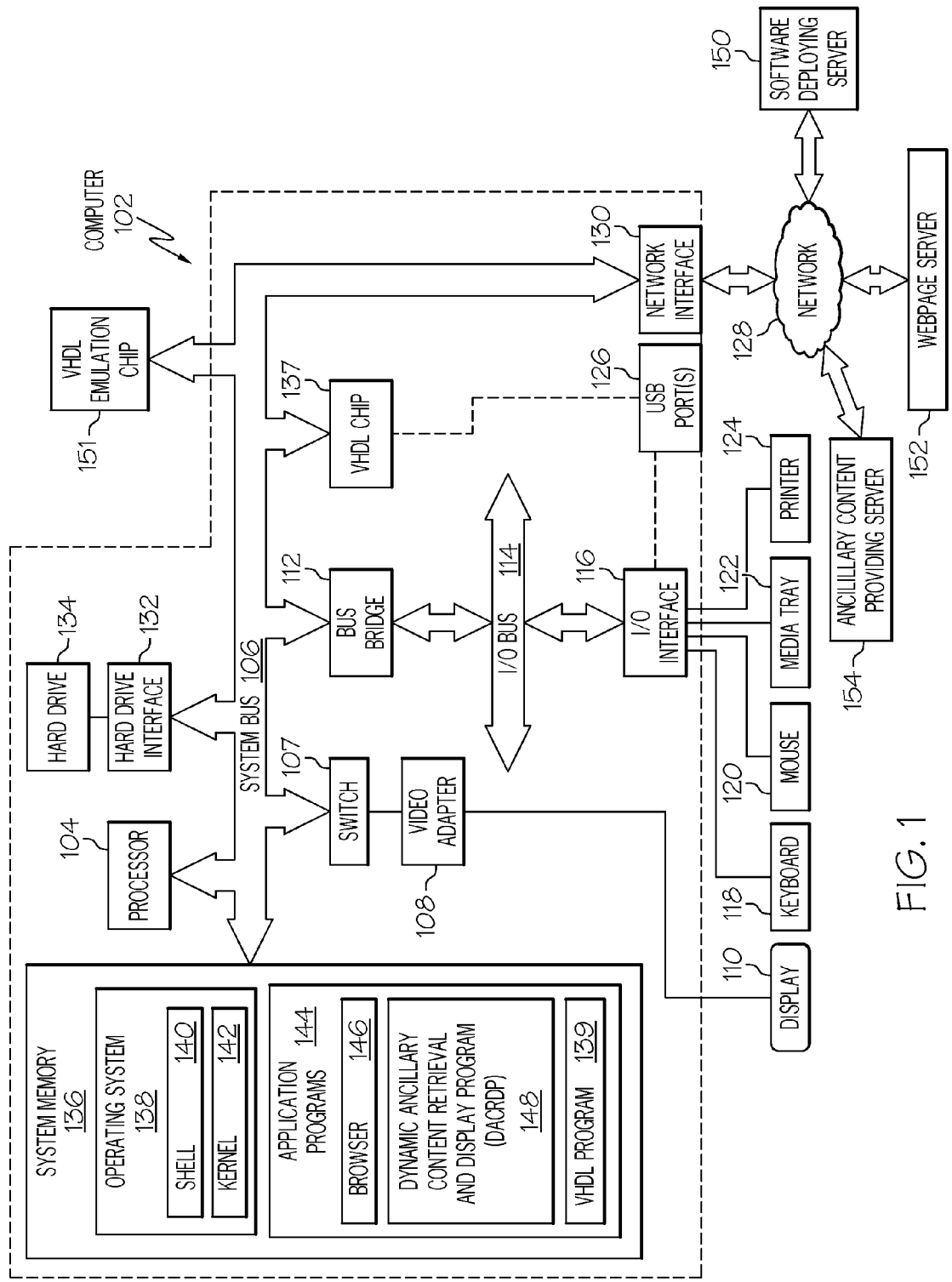
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, a webpage server 152, and/or an ancillary content providing server 154.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, which may be mechanical, that allows the display 110 to be coupled to the system bus 106, and thus to be functional only upon execution of instructions (e.g., dynamic ancillary content retrieval and display program—DACRDP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, status notification server 152, and/or ancillary content providing server 154 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a dynamic ancillary content retrieval and display program (DACRDP) 148. DACRDP 148 includes code for implementing the processes described below, including those described in FIGS. 2-3. In one embodiment, computer 102 is able to download DACRDP 148 from software deploying server 150, including in an on-demand basis, such that the code from DACRDP 148 is not downloaded until runtime or otherwise immediately needed by computer 102. Note further that, in one embodiment of the present disclosure, software deploying server 150 performs all of the functions associated with the present disclosure (including execution of DACRDP 148), thus freeing computer 102 from having to use its own internal computing resources to execute DACRDP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from DACRDP 148 causes VHDL program 139 to configure VHDL chip 137, which may be an FPGA, ASIC, etc.

In another embodiment of the present disclosure, execution of instructions from DACRDP 148 results in a utilization of VHDL program 139 to program a VHDL emulation chip 151. VHDL emulation chip 151 may incorporate a similar architecture as described above for VHDL chip 137. Once DACRDP 148 and VHDL program 139 program VHDL emulation chip 151, VHDL emulation chip 151 performs, as hardware, some or all functions described by one or more executions of some or all of the instructions found in DACRDP 148. That is, the VHDL emulation chip 151 is a hardware emulation of some or all of the software instructions found in DACRDP 148. In one embodiment, VHDL emulation chip 151 is a programmable read only memory (PROM) that, once burned in accordance with instructions from DACRDP 148 and VHDL program 139, is permanently transformed into a new circuitry that performs the functions needed to perform the process described below in FIGS. 2-3.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
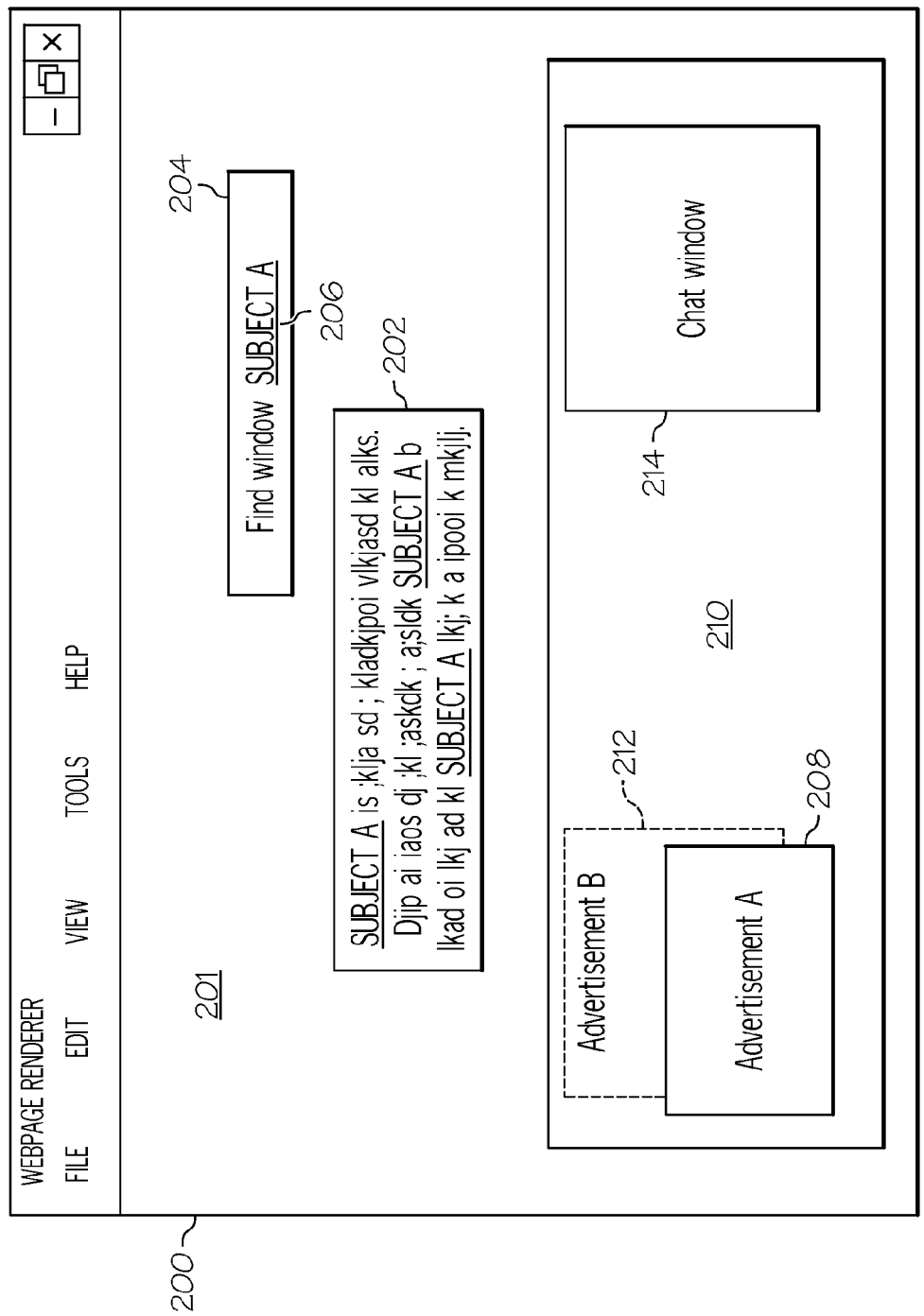
FIG. 2 illustrates a first exemplary graphical user interface (GUI) displaying a webpage with highlighted text that has been found using a find functionality.

With reference now to FIG. 2, an exemplary user interface (UI) 200, which in an exemplary embodiment is presented on the display 110 of computer 102 shown in FIG. 1, is for a webpage renderer that displays a main body 202 of a webpage 201. The webpage 201 is transmitted from a webpage server (e.g., webpage server 152 shown in FIG. 1). A user of the computer utilizes a text input window 204 to input a text entry 206, shown in the figure as "SUBJECT A". Text entry 206 results in an underlying find engine (e.g., part of DACRDP 148 shown in FIG. 1) locating and highlighting the text entry 206 wherever it appears in the main body 202 of the webpage. As described in further detail herein, logic such as DACRDP 148 shown in FIG. 1 also determines a textual context of the text entry 206 as it appears in the main body 202 of the webpage. This textual context is used to determine a general subject area related to the text entry 206. For example, assume that the text entry 206 is "School A". If the text surrounding the text entry 206 is related to basketball, then an assumption can be made that the text entry is related to the basketball program as School A.

Furthermore, DACRDP 148 is able, using metatags, contextual analysis, etc., to determine what type of webpage is being displayed on UI 200. Again, assume that the webpage displayed is related to sports, and specifically to basketball. DACRDP 148 thus identifies the type of webpage as being "basketball related," based on that webpage's metatags, etc.

Based on the textual context of the text entry and the type of webpage being displayed, a first ancillary content such as "Advertisement A" (first ancillary content 208) is displayed on a pre-defined area of the webpage being displayed on UI 200. First ancillary content 208 has been determined to be relevant to the textual context and the type of webpage, and thus will be of interest to the user. As described in further detail herein, in one embodiment the first ancillary content 208 can be replaced by a second ancillary content 212, such as the depicted "Advertisement B". The second ancillary content 212 replaces the first ancillary content 208 upon determining that the second ancillary content 212 will be of greater interest to the user than the first ancillary content 208. Note that while the first and/or second ancillary contents 208/212 are depicted as advertisement, in another embodiment the ancillary content can be a chat window 214. Chat window 214 is a real-time live chat window that is devoted to the scope of the text entry (i.e., basketball at School A in the example presented). In other embodiments, the ancillary content may be any content that is different from the content provided in the main body 202. Examples of such ancillary content include, but are not limited to, coupons, links to other webpages, links to social network groups, auto-connections to other applications such as e-mail, instant messaging, etc., links to telephone communication systems (e.g., voice over internet protocol—VoIP systems), etc. Note that some or all of the ancillary content described herein may be provided by an ancillary content providing server 154 shown in FIG. 1. Ancillary content providing server 154 is utilized by an entity that provides the ancillary content described herein.

Figure 3:
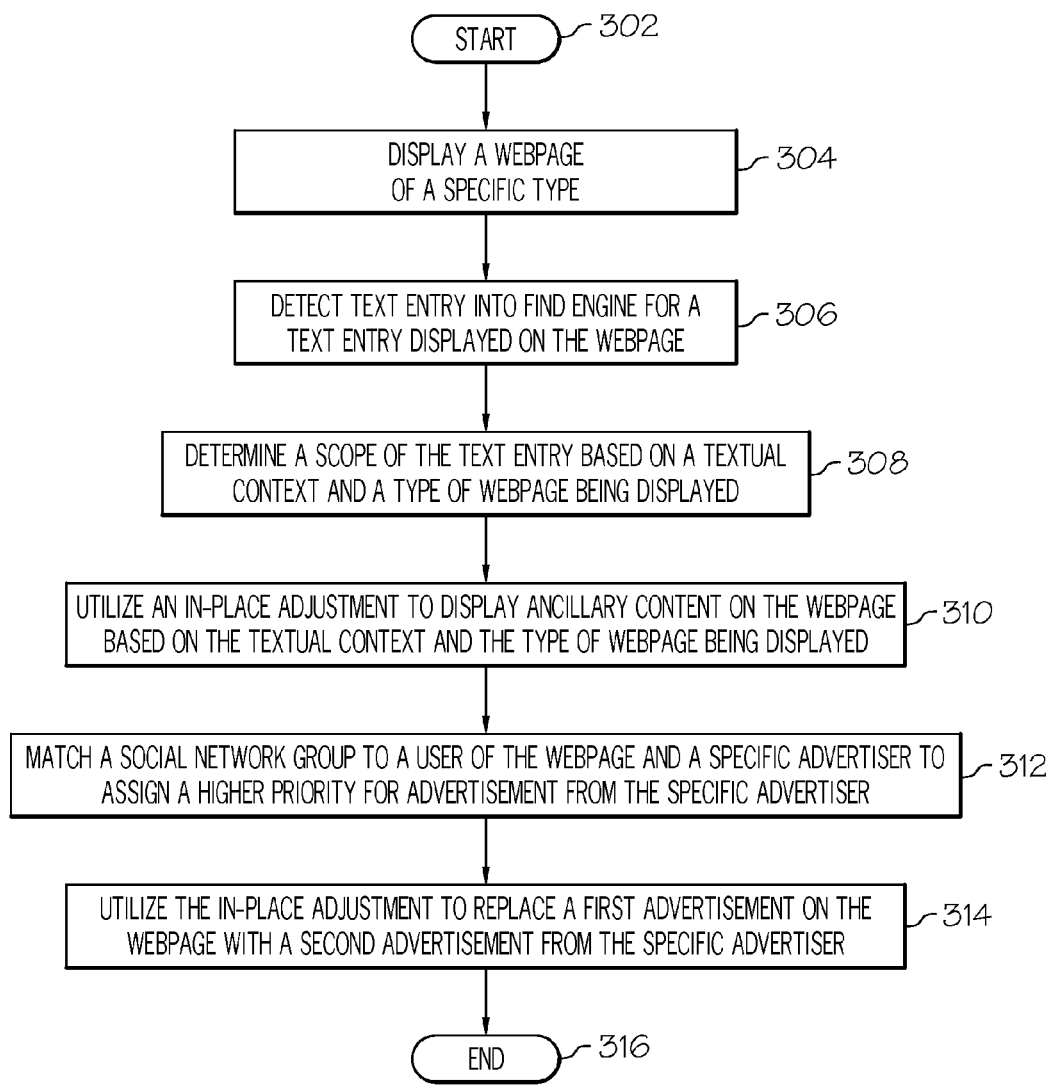
FIG. 3 is a high level flow chart of one or more exemplary steps performed by a computer to dynamically display content on a webpage.

With reference now to FIG. 3, a high level flow chart of one or more exemplary steps performed by a computer to dynamically display content on a webpage is presented. After initiator block 302, a webpage is displayed to a user on a monitor (block 304). This webpage is of a specific type, such as a sports webpage, a business webpage, an academic webpage, etc. Logic used to monitor the webpage then detects that a user has entered a text entry into a window used by a find engine (block 306). This find engine is software that locates and highlights the text entry within a main body of a webpage being displayed on a computer. The main body of the webpage provides the main content of the webpage. In one embodiment, this does not include advertisements, function windows, etc., but rather is the main content provided by a webmaster, and thus is the only content that is examined by the find engine. In another embodiment described herein, however, the user may use the find engine to look for key words (text entries) in advertisements or other dynamically changing content. In one embodiment, a "fuzzy search" for a text entry entered into a find engine is used to locate not only the exact text entry entered by the user, but also to locate related, synonymous, and/or relevant terms from the webpage.

As described in block 308, a scope of the text entry is then determined. The scope of the text entry defines a general subject area related to the text entry. For example, the general subject area, and thus the scope of the text entry, may be sports, business, education, etc. This scope may be determined by evaluating the context in which the text entry is found in the main body (or other area, including ancillary content) of the webpage/display. For example, if the text entry into the find engine is "School A" and the content of the main body is about basketball, then the scope is deemed to be related to the basketball program at School A. The scope is further determined by examining the type of webpage being displayed. For example, if the webpage is from a sports network or sports magazine, or if the webpage has metadata/metatags labeled "sports", then it is determined that, when the user asked the find engine to locate entries for School A in the webpage, the user is interested in the sports program for School A.

As described in block 310, the textual context of the text entry in the webpage and the type of webpage are used by an in-place adjustment logic (e.g., DACRDP 148 shown in FIG. 1) to retrieve and display ancillary content into the webpage without refreshing the main body of the webpage. This in-place adjustment logic ensures that the main body of the webpage remains static/fixed, but ancillary content (such as advertisements) is dynamically retrieved and/or replaced in accordance with the present disclosure. In one embodiment, this ancillary content is advertisement. In another embodiment, the ancillary content may be non-advertisement content, such as a live chat window that is devoted to the scope of the text entry. This chat window may be from a customer service center (e.g., a chat window for ticket sales to sports events at School A), or may be a purely social chat window (e.g., with other fans of School A's athletic programs). In one embodiment, determining what ancillary content to retrieve can be performed by identifying a related product to the text entry, wherein the related product is not directly identified by the text entry. That is, assume that the text entry was "School A". A related product may be for athletic clothing that may or may not display the logo for School A. Nonetheless, advertisement for this related product can be presented as a component of the ancillary content, even though "School A" does not appear in the ancillary content itself.

As depicted in block 312, determining what ancillary content is retrieved and displayed can be further refined by matching a viewing party of the webpage to an advertiser who is in the same social network. That is, assume that the user who entered the text entry into the find engine is in a same social network as an owner of a company. As such, these two parties are deemed to have a pre-established relationship, and thus advertisements from this company owner are given precedence over other advertisers. Therefore, as described in block 314, the first ancillary content on the webpage is replaced with a second ancillary content, which is provided by the member of the same group in the social network as the user of the computer (i.e., the person viewing the webpage).

Note that in one embodiment, the first ancillary content can be replaced by a second ancillary content for other reasons. For example, a textual context of the first ancillary content can be determined, and an ancillary content type (i.e., the ancillary content type that is devoted to the general subject area) of the first ancillary content is also determined. The find engine can then be automatically executed by applying the text entry against the first ancillary content to determine a relevancy level of the first ancillary content to the text entry. The second ancillary content may be deemed more relevant to the scope of the text entry than the first ancillary content based on a combination of the textual context from the webpage, the textual context from the first ancillary content, the type of webpage being displayed, the ancillary content type, and the relevancy level of the first ancillary content to the text entry. If the second ancillary content is deemed more relevant to the scope of the text entry, then the second ancillary content replaces the first ancillary content on the webpage.

In either embodiment (based on common social groupings or based on textual context, etc.), the second ancillary content may be retrieved and displayed only if a first quantity of entries of the text entry in the main body of the webpage exceeds a first predetermined number, and if a second quantity of entries of the text entry in the first ancillary content is less than a second predetermined number. For example, the second ancillary content may be displayed only if there are more than five instances of the text entry in the main body of the webpage, and there are less than three entries of the text entry in the first ancillary content. This ensures that the second ancillary content is needed due to interest of the user (based on the number of instances that the text entry "School A" came up in the main body of the webpage), and due to the relative insignificance of the first ancillary content (due to the limited number of times "School A" came up in the first ancillary content). In another embodiment, the first ancillary content is retrieved and displayed on the webpage only if the text entry is displayed multiple times, including more than some predetermined amount, in the main body of the webpage, in order to reflect the interest in the text entry indicated by the user entering that text entry into the find engine's entry box.

The process ends at terminator block 316.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method of dynamically displaying ancillary content on a webpage, the computer implemented method comprising:
    a processor detecting a text entry into a find engine, wherein the find engine is software that locates and highlights the text entry within a main body of a webpage being displayed on a computer;
    determining a scope of the text entry based on a first textual context of the text entry and a type of webpage being displayed, wherein the scope of the text entry defines a general subject area related to the text entry, and wherein the type of webpage is devoted to the general subject area;
    utilizing an in-place adjustment to automatically retrieve and display a first ancillary content on the webpage based on the first textual context of the text entry and the type of webpage being displayed, wherein the in-place adjustment incorporates the first ancillary content into the webpage without refreshing the main body of the webpage;
    matching a social network group to a user of the computer and to a provider of the first ancillary content, wherein the user of the computer and the provider of the first ancillary content are members of a same group in a social network;
    replacing the first ancillary content on the webpage with a second ancillary content, wherein the second ancillary content is provided by the provider that is a member of the same group in the social network as the user of the computer;
    determining a second textual context of the first ancillary content;
    determining an ancillary content type of the first ancillary content, wherein the ancillary content type is devoted to the general subject area;
    automatically executing the find engine with the text entry against the first ancillary content to determine a relevancy level of the first ancillary content to the text entry;
    determining that the second ancillary content is more relevant to the scope of the text entry than the first ancillary content based on a combination of the first textual context, the second textual context, the type of webpage being displayed, the ancillary content type, and the relevancy level of the first ancillary content to the text entry;
    replacing the first ancillary content on the webpage with the second ancillary content; and
    retrieving and displaying the second ancillary content only if a first quantity of entries of the text entry in the main body of the webpage exceeds a first predetermined number, and if a second quantity of entries of the text entry in the first ancillary content are less than a second predetermined number.

2. A computer system comprising:
a central processing unit; and
a computer readable memory coupled to the central processing unit, wherein the computer readable memory comprises software which, when executed, causes the central processing unit to implement:
detecting a text entry into a find engine, wherein the find engine is software that locates and highlights the text entry within a main body of a webpage being displayed on a computer;
determining a scope of the text entry based on a first textual context of the text entry and a type of webpage being displayed, wherein the scope of the text entry defines a general subject area related to the text entry, and wherein the type of webpage is devoted to the general subject area;
utilizing an in-place adjustment to automatically retrieve and display a first ancillary content on the webpage based on the first textual context of the text entry and the type of webpage being displayed, wherein the in-place adjustment incorporates the first ancillary content into the webpage without refreshing the main body of the webpage;
matching a social network group to a user of the computer and to a provider of the first ancillary content, wherein the user of the computer and the provider of the first ancillary content are members of a same group in a social network; and replacing the first ancillary content on the webpage with a second ancillary content, wherein the second ancillary content is provided by the provider that is a member of the same group in the social network as the user of the computer;

determining a second textual context of the first ancillary content;

determining an ancillary content type of the first ancillary content, wherein the ancillary content type is devoted to the general subject area;

automatically executing the find engine with the text entry against the first ancillary content to determine a relevancy level of the first ancillary content to the text entry;

determining that the second ancillary content is more relevant to the scope of the text entry than the first ancillary content based on a combination of the first textual context, the second textual context, the type of webpage being displayed, the ancillary content type, and the relevancy level of the first ancillary content to the text entry;

replacing the first ancillary content on the webpage with the second ancillary content; and retrieving and displaying the second ancillary content only if a first quantity of entries of the text entry in the main body of the webpage exceeds a first predetermined number, and if a second quantity of entries of the text entry in the first ancillary content are less than a second predetermined number.

3. A computer program product comprising a computer readable storage medium embodied therewith, the computer readable storage medium comprising:

computer readable program code configured to detect a text entry into a find engine, wherein the find engine is software that locates and highlights the text entry within a main body of a webpage being displayed on a computer;

computer readable program code configured to determine a scope of the text entry based on a first textual context of the text entry and a type of webpage being displayed, wherein the scope of the text entry defines a general subject area related to the text entry, and wherein the type of webpage is devoted to the general subject area;

computer readable program code configured to utilize an in-place adjustment to automatically retrieve and display a first ancillary content on the webpage based on the first textual context of the text entry and the type of webpage being displayed, wherein the in-place adjustment incorporates the first ancillary content into the webpage without refreshing the main body of the webpage;

computer readable program code configured to match a social network group to a user of the computer and to a provider of the first ancillary content, wherein the user of the computer and the provider of the first ancillary content are members of a same group in a social network;

computer readable program code configured to replace the first ancillary content on the webpage with a second ancillary content, wherein the second ancillary content is provided by the provider that is a member of the same group in the social network as the user of the computer;

computer readable program code configured to determine a second textual context of the first ancillary content;

computer readable program code configured to determine an ancillary content type of the first ancillary content, wherein the ancillary content type is devoted to the general subject area;

computer readable program code configured to automatically execute the find engine with the text entry against the first ancillary content to determine a relevancy level of the first ancillary content to the text entry;

computer readable program code configured to determine that the second ancillary content is more relevant to the scope of the text entry than the first ancillary content based on a combination of the first textual context, the second textual context, the type of webpage being displayed, the ancillary content type, and the relevancy level of the first ancillary content to the text entry;

computer readable program code configured to replace the first ancillary content on the webpage with the second ancillary content; and computer readable program code configured to retrieve and display the second ancillary content only if a first quantity of entries of the text entry in the main body of the webpage exceeds a first predetermined number, and if a second quantity of entries of the text entry in the first ancillary content are less than a second predetermined number.

4. The computer-implemented method of claim 1, further comprising:

retrieving and displaying the first ancillary content on the webpage only if the text entry is displayed multiple times in the main body of the webpage.

5. The computer-implemented method of claim 1, wherein the ancillary content is advertisement.

6. The computer-implemented method of claim 1, wherein the ancillary content is a real-time live chat window that is devoted to the scope of the text entry.

7. The computer-implemented method of claim 1, further comprising:

reserving a pre-defined area of the webpage for displaying the first ancillary content.

8. The computer implemented method of claim 1, wherein the general subject area is sports.

9. The computer system of claim 2, wherein the software, when executed, causes the central processing unit to further implement:

retrieving and displaying the first ancillary content on the webpage only if the text entry is displayed multiple times in the main body of the webpage.

10. The computer program product of claim 3, further comprising:

computer readable program code configured to retrieve and display the first ancillary content on the webpage only if the text entry is displayed multiple times in the main body of the webpage.

11. The computer-implemented method of claim 5, further comprising:

identifying a related product to the text entry, wherein the related product is not directly identified by the text entry; and presenting advertisement for the related product as a component of the first ancillary content.

* * * * *